US009065296B2

(12) United States Patent
Shim

(10) Patent No.: US 9,065,296 B2
(45) Date of Patent: Jun. 23, 2015

(54) BATTERY PACK, METHOD OF MEASURING VOLTAGE OF THE BATTERY PACK, AND ENERGY STORAGE SYSTEM INCLUDING THE BATTERY PACK

(75) Inventor: Kyung-Sub Shim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 348 days.

(21) Appl. No.: 13/568,836

(22) Filed: Aug. 7, 2012

(65) Prior Publication Data

US 2013/0257383 A1 Oct. 3, 2013

Related U.S. Application Data

(60) Provisional application No. 61/619,875, filed on Apr. 3, 2012.

(51) Int. Cl.
*H02J 7/00* (2006.01)
*H02J 3/32* (2006.01)

(52) U.S. Cl.
CPC .................. *H02J 3/32* (2013.01); *H02J 7/0021* (2013.01); *H02J 7/0022* (2013.01)

(58) Field of Classification Search
CPC .......... G01R 31/3655; G01R 31/3658; H01M 10/42; H01M 10/44; H01M 6/5011; H02J 7/0003; H02J 7/0011
USPC .......... 320/434, 133, 116, 134, 107, 127, 118
See application file for complete search history.

(56) References Cited

U.S. PATENT DOCUMENTS

| 5,914,606 | A | * | 6/1999 | Becker-Irvin | 324/434 |
| 5,965,996 | A | * | 10/1999 | Arledge et al. | 320/116 |
| 7,679,369 | B2 | * | 3/2010 | Hartzog et al. | 324/426 |
| 7,834,635 | B2 | * | 11/2010 | Oosawa et al. | 324/429 |
| 2006/0028179 | A1 | * | 2/2006 | Yudahira et al. | 320/133 |
| 2006/0091854 | A1 | * | 5/2006 | Chen et al. | 320/116 |
| 2008/0100266 | A1 | * | 5/2008 | Sobue | 320/134 |
| 2010/0219837 | A1 | | 9/2010 | Austerschulte | |

(Continued)

FOREIGN PATENT DOCUMENTS

| JP | 2007-240299 A | 9/2007 |
| JP | 2009-276297 A | 11/2009 |

(Continued)

OTHER PUBLICATIONS

KIPO Office action dated Feb. 6, 2014, for corresponding Korean Patent Application No. 10-2013-0008632, (27 pages).

(Continued)

*Primary Examiner* — Brian Ngo
(74) *Attorney, Agent, or Firm* — Christie, Parker & Hale LLP

(57) ABSTRACT

A battery system including: a battery, which includes at least one battery cell; a division circuit configured to receive a first voltage of the battery, generate a second voltage from the first voltage, and output the second voltage; an isolation circuit coupled between the battery and the division circuit, the isolation circuit being configured to electrically isolate the battery from the division circuit according to a control signal; and a battery management system coupled to the division circuit. The battery management system includes an isolation circuit control unit configured to generate the control signal; and a measuring unit configured to measure the second voltage.

12 Claims, 4 Drawing Sheets

(56) References Cited

U.S. PATENT DOCUMENTS

2010/0315037 A1* 12/2010 Aiura et al. .................. 320/107
2011/0101920 A1* 5/2011 Seo et al. ..................... 320/127
2011/0127963 A1* 6/2011 Murao et al. ................. 320/118
2011/0313613 A1* 12/2011 Kawahara et al. ............ 701/29

FOREIGN PATENT DOCUMENTS

| JP | 2011-501808 A | 1/2011 |
|---|---|---|
| KR | 10-2009-0084854 | 8/2009 |
| KR | 10-0911565 | 8/2009 |
| KR | 10-2010-0049906 A | 5/2010 |

OTHER PUBLICATIONS

English Machine Translation of Japanese Publication No. 2007-240299, listed above, 35 pages.
English Machine Translation of Japanese Publication No. 2009-276297, listed above, 35 pages.
Korean Patent Abstracts, Publication No. 1020090006292 A, dated Jan. 15, 2009, for corresponding Koren Patent 10-0911565 listed above.

* cited by examiner

BATTERY PACK, METHOD OF MEASURING VOLTAGE OF THE BATTERY PACK, AND ENERGY STORAGE SYSTEM INCLUDING THE BATTERY PACK

CROSS-REFERENCE TO RELATED PATENT APPLICATIONS

This application claims priority to and the benefit of U.S. Provisional Application No. 61/619,875, filed on Apr. 3, 2012, in the United States Patent and Trademark Office, the entire disclosure of which is incorporated herein by reference.

BACKGROUND

1. Field

Aspects of embodiments of the present invention relate to a method of measuring a voltage of a battery pack and an energy storage system including the battery pack.

2. Related Art

As problems such as environmental contamination and resource exhaustion increase, interest in systems for storing energy and for efficiently using the stored energy also increase. There is also increased interest in renewable energy that does not cause pollution during power generation. Thus, research into energy storage systems, which may be used with renewable energy, a power storage battery system, and existing grid power, has been actively conducted as changes occur in the environment.

For the energy storage systems, efficient management of batteries is one of the important issues. Batteries are to be controlled in regard to various features such as charging, discharging, or cell balancing. By efficiently controlling the batteries, the lifespan of the batteries may be increased, and power may be stably supplied to a load.

SUMMARY

One or more embodiments of the present invention include a method of efficiently measuring a total voltage of a battery pack and an energy storage system including the battery pack.

According to one or more embodiments of the present invention, there is provided a battery system including: a battery including at least one battery cell; a division circuit configured to receive a first voltage of the battery, generate a second voltage from the first voltage, and output the second voltage; an isolation circuit coupled between the battery and the division circuit, the isolation circuit being configured to electrically isolate the battery from the division circuit according to a control signal; and a battery management system coupled to the division circuit, the battery management system including: an isolation circuit control unit configured to generate the control signal; and a measuring unit configured to measure the second voltage.

In one or more embodiments, the battery management system further includes: a monitoring unit configured to monitor a state of the battery and to generate battery state information; a control unit configured to receive the battery state information, and control the isolation circuit control unit to selectively provide the control signal according to the battery state information. The isolation circuit may be configured to electrically isolate the battery from the division circuit when the control signal is not provided.

The monitoring unit may be configured to monitor a charging/discharging rate of the battery, and to transmit the charging/discharging rate to the control unit; and the control unit may be configured to compare the charging/discharging rate to a reference charging/discharging value, and to control the isolation circuit control unit to provide the control signal for a time substantially less than a time when the control signal is not provided when the charging/discharging rate is greater than the reference charging/discharging value.

The monitoring unit may be configured to monitor a noise signal from the battery, to generate noise information from the noise signal, and to transmit the noise information to the control unit; and the control unit may be configured to compare the noise information to a reference noise value, and to control the isolation circuit control unit to provide the control signal for a time substantially less than a time when the control signal is not provided when the noise information is greater than the reference noise value.

In one or more embodiments, the battery management system further includes a voltage calculating unit configured to calculate the first voltage from the second voltage.

The battery system may further include a capacitor coupled to the division circuit and the battery management system, the capacitor being configured to be charged with the second voltage.

In one or more embodiments, the battery further includes a first battery terminal and a second battery terminal; the division circuit includes a first input terminal and a second input terminal; the isolation circuit includes a first switch and a second switch; the first switch is configured to couple the first battery terminal to the first input terminal according to the control signal; the second switch is configured to couple the second battery terminal to the second input terminal according to the control signal; the at least one battery cell is coupled between the first battery terminal and the second battery terminal; and the division circuit includes a plurality of division elements coupled between the first input terminal and the second input terminal for dividing the first voltage into the second voltage.

The plurality of division elements may include a first division element, and the measuring unit may be coupled to the first division element and may be configured to measure the second voltage by measuring a voltage across the first division element. The plurality of division elements may include resistors. The plurality of division elements may include transistors. The first switch and the second switch may include optocouplers.

In one or more embodiments, the first voltage is a total voltage of the battery; and the second voltage is proportional to the total voltage by a factor of N, where N is a positive real number.

The second voltage may be an instantaneous voltage.

According to one or more embodiments of the present invention, there is provided an energy storage system including: a power control system; and a battery system coupled to the power control system and including: a battery including at least one battery cell; a division circuit configured to receive a voltage of the battery, to generate a divided voltage from the voltage of the battery, and to output the divided voltage; an isolation circuit coupled between the battery and the division circuit, the isolation circuit being configured to electrically isolate the battery from the division circuit according to a control signal; and a battery management system coupled to the division circuit, the battery management system being configured to monitor a state of the battery, to generate the control signal according to the state of the battery, to receive the divided voltage, and to calculate a total voltage of the battery from the divided voltage, wherein the energy storage system is configured to store a power generated by a power generation system or a grid in the battery, and supply the power stored in the battery to a load or the grid, and the power control system is configured to convert power of at least one of the power generation system, the grid, or the battery.

The battery management system may be configured to monitor a charging/discharging rate of the battery, to compare the charging/discharging rate to a reference charging/discharging value, and to provide the control signal to electrically couple the battery to the division circuit for a time substantially less than a time when the control signal is not provided when the charging/discharging rate is greater than the reference charging/discharging value.

The battery management system may be configured to monitor a noise signal from the battery, to compare the noise signal to a reference noise value, and to provide the control signal to electrically couple the battery to the division circuit for a time substantially less than a time when the control signal is not provided when the noise signal is greater than the reference noise value.

The divided voltage may be an instantaneous voltage.

According to aspects of embodiments of the present invention, a method of efficiently measuring a total voltage of a battery pack and an energy storage system including the battery pack is provided.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
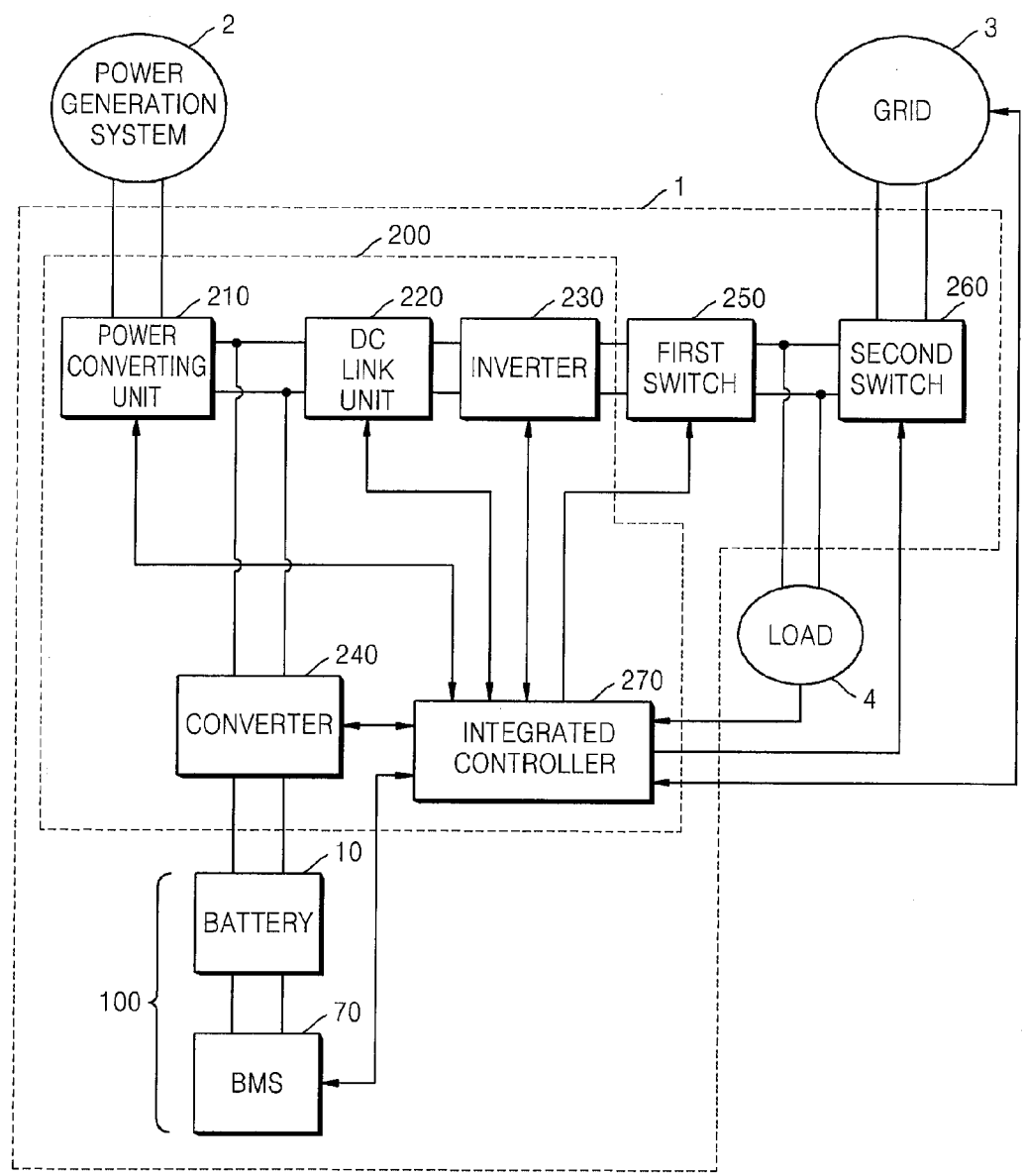
FIG. 1 is a block diagram illustrating an energy storage system according to an embodiment of the present invention.

Aspects of embodiments of the present invention will now be described more fully with reference to the accompanying drawings, in which exemplary embodiments of the invention are shown. The embodiments will be described in detail such that one of ordinary skill in the art may readily make and use the present disclosure. It should be understood that the embodiments of the present invention may vary but do not have to be mutually exclusive. For example, particular shapes, structures, and properties according to an embodiment described in this specification may be modified in other embodiments without departing from the spirit and scope of the present invention. In addition, positions and/or arrangement of individual components of each of the embodiments may also be modified without departing from the spirit and scope of the present invention. Accordingly, the detailed description below should not be construed as having limited meanings but, instead, should be construed to encompass the scope of the claims and any equivalents thereof.

Hereinafter, aspects of embodiments of the present invention will be described more fully with reference to the accompanying drawings, in which exemplary embodiments of the present invention are shown such that one of ordinary skill in the art may readily make and use the present disclosure. In the drawings, like elements are denoted by like reference numerals, and repeated description thereof may be omitted. In addition, when an element is referred to as being "coupled to" another element, it may be directly coupled to the another element or be indirectly coupled to the another element with one or more intervening elements interposed therebetween.

FIG. 1 is a block diagram of an energy storage system 1 according to an embodiment of the present invention.

Referring to FIG. 1, the energy storage system 1 is used with a power generation system 2 and/or a grid 3 to supply power to a load 4.

The power generation system 2 generates power by using an energy source and supplies the power to the energy storage system 1. Examples of the power generation system 2 may include any power systems that generate power using renewable energy, such as a solar power generation system, a wind power generation system, or a tidal power generation system.

The grid 3 may include a power plant, a substation, power lines, and the like. In a normal state, the grid 3 supplies power to the energy storage system 1 so as to supply power to the load 4 and/or a battery 10. The grid 3 may also receive power from the energy storage system 1 while in a normal state. If the grid 3 is in an abnormal state, however, power supplied from the grid 3 to the energy storage system 1 may be stopped and power supplied from the energy storage system 1 to the grid 3 may also be stopped.

The load 4 consumes power generated by the power generation system 2, power stored in the battery 10, and/or power supplied from the grid 3. A house, a motor, and a factory are examples of the load 4.

The energy storage system 1 may store power generated by the power generation system 2 in the battery 10, and may supply the power generated by the power generation system 2 to the grid 3. The energy storage system 1 may supply power stored in the battery 10 to the grid 3, or may store power supplied from the grid 3 in the battery 10. If the grid 3 is in an abnormal state, for example, if there is a power failure in the grid 3, the energy storage system 1 may perform an uninterruptible power supply (UPS) operation. In addition, the energy storage system 1 may supply power produced by the power generation system 2 or power stored in the battery 10 to the load 4 even when the grid 3 is in a normal state.

In one or more embodiments, the energy storage system 1 includes a power control system (PCS) 200 that controls power conversion, a first switch 250, a second switch 260, a battery management system (BMS) 70, and a battery 10.

The PCS 200 converts the power of at least one of the power generation system 2, the grid 3, or the battery 10 into a suitable power and supplies the converted power to where it's needed. The PCS 200 may include a power converting unit 210, a direct current (DC) link unit 220, an inverter 230, a converter 240, and an integrated controller 270.

In one or more embodiments, the power converting unit 210 is coupled (e.g., electrically coupled or connected) between the power generation system 2 and the DC link unit 220. Here, the power converting unit 210 delivers power generated by the power generation system 2 to the DC link unit 220. Accordingly, an output voltage of the power output from the power converting unit 210 is converted into a DC link voltage. As such, the power converting unit 210 is configured to convert the power from the power generation system 2 into a suitable power for the DC link unit 220. The power converting unit 210 may perform other functions as well; for example, if the power generation system 2 is a solar power generation system, the power converting unit 210 may include a maximum power point tracking (MPPT) converter so as to obtain maximum power output from the power generation system 2 according to a change in solar radiation, temperature, or the like.

The amplitude of a DC link voltage may become unstable due to, for example, an instantaneous voltage drop of the power generation system 2 or the grid 3 or due to a generation of a peak load in the load 40. However, a normal operation of the converter 240 and the inverter 230 is improved when the DC link voltage is stable. Accordingly, the DC link unit 220 may include, for example, a large capacity capacitor for stabilizing the DC link voltage, which is coupled between the power converting unit 210 and the inverter 230 so as to maintain a stable DC link voltage.

In one or more embodiments, the inverter 230 is a power converter coupled between the DC link unit 220 and the first switch 250. The inverter 230 may include an inverter that converts the DC link voltage output from the power generation system 2 and/or the battery 10 into an AC voltage of the grid 3 and may output the AC voltage in a discharging mode. Also, the inverter 230 may include a rectifying circuit that rectifies an AC voltage, converts the same into a DC link voltage, and outputs the same in order to store the power of the grid 3 in the battery 10 in a charging mode. The inverter 230 may be a bidirectional inverter or may include a plurality of inverters.

The inverter 230 may include a filter for removing harmonics from the AC voltage output to the grid 3. In addition, to reduce or prevent generation of ineffective power, the inverter 230 may include a phase-locked loop (PLL) circuit for matching a phase of the AC voltage output from the inverter 230 to a phase of the AC voltage of the grid 3. Also, the inverter 230 may perform other functions such as restriction of voltage variation range, power factor correction, removal of DC components, and transient protection.

In one or more embodiments, the converter 240 is a power converter coupled between the DC link unit 220 and the battery 10. Here, the converter 240 performs DC-DC conversion by converting a voltage of power output from the battery 10 into a voltage level suitable for the inverter 230, i.e., the DC link voltage, and outputs the same in a discharging mode. Also, the converter 240 may perform DC-DC conversion by converting a voltage of power output from the power converting unit 210 or the inverter 230 into a voltage level suitable for the battery 10, i.e., a charge voltage, in a charging mode. The converter 240 may be a bidirectional converter or may include a plurality of converting circuits.

The integrated controller 270 may monitor states of the power generation system 2, the grid 3, the battery 10, and/or the load 4, and may control the power converting unit 210, the inverter 230, the converter 240, the first switch 250, the second switch 260, and/or the BMS 70 according to results of the monitoring. The integrated controller 270 may monitor whether a power failure occurs in the grid 3, whether the power generation system 2 generates power, an amount of power generated by the power generation system 2, a charge state of the battery 10, an amount of power consumed by the load 4, time, and the like.

In FIG. 1, the first switch 250 and the second switch 260 are coupled in series between the inverter 230 and the grid 3, and control the flow of current between the power generation system 2 and the grid 3 by being turned on or off under the control of the integrated controller 270. The first switch 250 and the second switch 260 may be turned on or off according to states of the power generation system 2, the grid 3, and/or the battery 10. For example, if a large amount of power is required by the load 40, the first switch 250 and the second switch 260 may both be turned on so that all power of the power generation system 2 and the grid 3 may be used. However, if the power of the power generation system 2 and the grid 3 is insufficient to satisfy the required amount of power by the load 4, power stored in the battery 10 may be supplied to the load. If there is a power failure in the grid 3, the second switch 260 may be turned off and the first switch 250 may be turned on. Accordingly, power from the power generation system 2 and/or the battery 10 may be supplied to the load 4, but may not flow into the grid 3, thereby preventing a worker, who works at a power distribution line of the grid 3 or the like, from getting an electric shock.

In one or more embodiments, the BMS 70 is coupled to the battery 10 and controls charging and discharging of the battery 10 according to a control of the integrated controller 270. In order to protect the battery 10, the BMS 70 may reduce or prevent overcharging, over-discharging, over-current, over-voltage, or over-heating, cell balancing, or the like. To this end, the BMS 70 may monitor a voltage, a current, a temperature, a remaining power amount, a lifespan, a charging state, or the like, and may transmit a monitoring result to the integrated controller 270.

The battery 10 receives power generated by the power generation system 2 or the power of the grid 3 and stores the same, and supplies the stored power to the load 4 or the grid 3. The number of the batteries 10 may be determined in consideration of power capacity required by the energy storage system 1 and design conditions thereof. For example, if consumption power of the load 4 is large, a plurality of batteries 10 may be included, and if consumption power of the load 4 is small, just one battery 10 may be included.

The BMS 70 is coupled to the battery 10, and controls charging and discharging operations of the battery 10 under the control of the integrated controller 270. To protect the battery 10, the BMS 70 may reduce or prevent overcharging, over-discharging, over-current, over-voltage, or over-heating, or the like. To this end, the BMS 70 may monitor a voltage, a current, a temperature, a remaining power amount, a lifespan, a charging state, or the like of the battery 10, and may transmit a monitoring result to the integrated controller 270. In one or more embodiments, the BMS 70 measures a voltage with a higher accuracy even when a charging/discharging rate (c-rate) is higher than a reference rate. A method of measuring a voltage will be described in detail below with reference to FIGS. 2 through 5.

In the present disclosure, a charging/discharging rate refers to a value obtained by dividing a discharging current or a charging current by a rated capacity of a battery, and may be expressed as: charging/discharging C rate(A)=charging/discharging current (A)/rated capacity. If the charging/discharging rate is higher than a suitable reference rate, a range of fluctuation of a voltage of the battery 10 is large.

Figure 2:
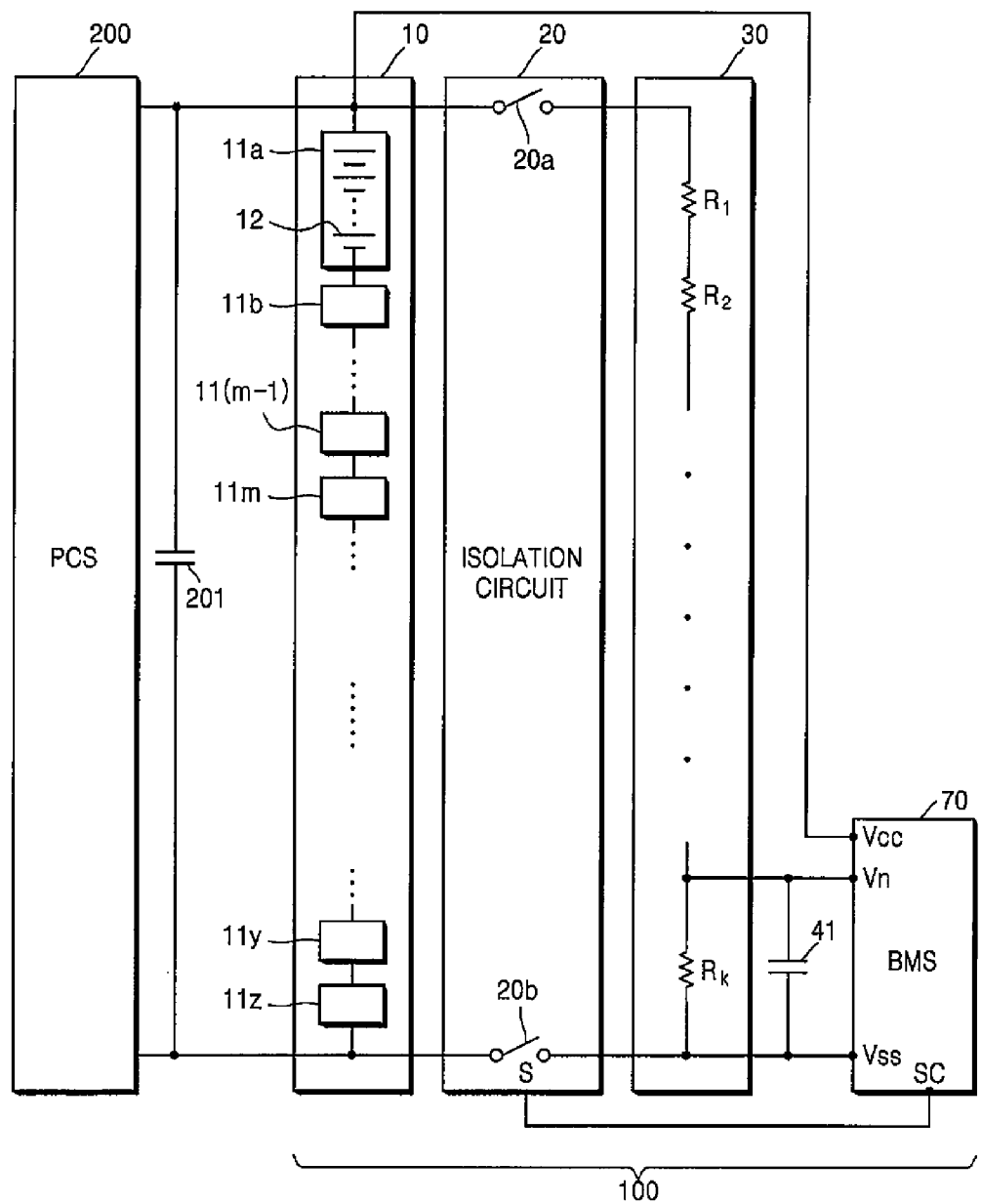
FIG. 2 is a block diagram illustrating a battery system according to an embodiment of the present invention.

FIG. 2 is a block diagram illustrating a battery system 100 according to an embodiment of the present invention.

Referring to FIG. 2, the battery system 100 includes a battery 10, an isolation circuit 20, and a division circuit 30.

The battery 10 stores power supplied from the outside via charging, and/or supplies stored power to the outside via discharging.

The battery 10 may include a plurality of battery modules 11a through 11z that may be coupled serially, in parallel, or combinations thereof. Also, the plurality of battery modules 11a through 11z may each include at least one battery cell 12. When a plurality of battery cells 12 are included in the battery modules 11a through 11z, the battery cells 12 in the battery modules 11a through 11z may be coupled serially, in parallel, or combinations thereof. The battery cells 12 may be rechargeable batteries. The battery modules 11a through 11z and the battery cells 12 will be described hereafter as being, respectively, serially coupled; however, this is for convenience of description only, and the coupling of the battery modules and the battery cells is not limited thereto. Also, the number of the battery modules 11a through 11z and the number of battery cells 12 of the battery modules 11a through 11z are not limited to the number show in FIG. 2.

Referring to FIG. 2, two ends (terminals) of the battery 10 are coupled to the PCS 200. A capacitor (condenser) 201 may be coupled in parallel with the battery 10 and the PCS 200. Also, two ends of the battery 10 may be electrically connected to the isolation circuit 20, which includes an isolation device, such as switches 20a and 20b. When the isolation circuit 20 is turned on, the battery 10 is coupled to the division circuit 30. For example, when the isolation circuit 20 is turned on, the battery 10 is coupled to the division circuit 30 through the switches 20a and 20b.

The isolation circuit 20 controls a current transfer path between the battery 10 and the division circuit 30, which will be described later. In one or more embodiments, according to an isolation control signal of the BMS 70, the isolation circuit 20 allows a current to flow between the battery 10 and the division circuit 30 when measuring a voltage of the battery 10, and when not measuring a voltage, the isolation circuit 20 isolates the battery 10 and the division circuit 30 from each other so that a noise signal is not transmitted to the BMS 70. According to embodiments of the invention, a noise signal is not transmitted to the BMS 70 even when a large current flows in the battery system 100 (e.g., a large discharge current).

By way of comparison, when measuring a voltage of the battery 10, if the division circuit 30 is directly coupled to the battery 10 without the isolation circuit 20 therebetween, results of the voltage measurements may vary according to a noise signal generated in the battery 10 due to, for example, a high current.

That is, as illustrated in FIG. 1, since the battery 10 is coupled to the PCS 200, a noise signal generated in the PCS 200 may affect the battery 10; alternatively, a noise signal, besides a voltage of the battery 10, may be measured as a large current flows through the battery 10. As described above, by including the isolation circuit 20 between the battery 10 and the division circuit 30 in order to reduce or prevent the effects of a noise signal, the battery 10 and a measuring unit 74 of the BMS 70 may be electrically isolated from each other, and a voltage of the battery 10, from which a noise signal is removed (or reduced), may be measured.

In addition, in the battery system 100, the battery 10 may be charged or discharged at a high c-rate.

Figure 3:
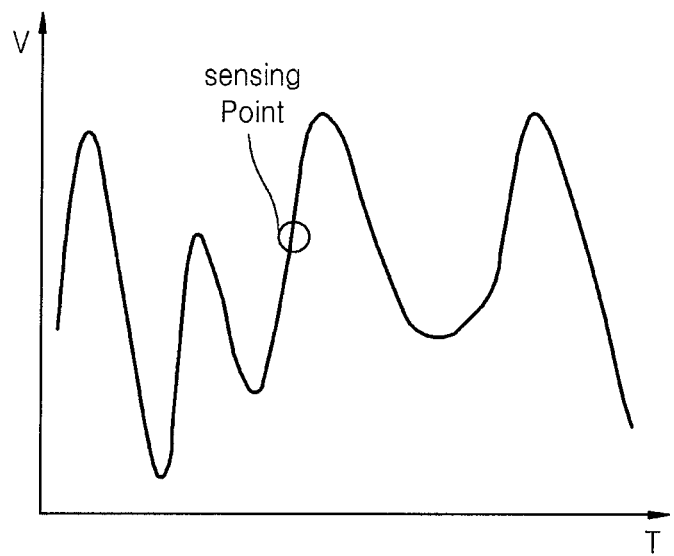
FIG. 3 is a graph showing a voltage variation when a battery is charged/discharged at a high charging/discharging rate.

FIG. 3 is a graph showing an example of a voltage variation when a battery is charged/discharged at a high charging/discharging rate.

In the voltage measuring method of the related art, during an abrupt variation of voltage, such as that observed in the graph of FIG. 3, it may be difficult to measure an exact value due to a voltage variation, and an accuracy measurement thereof may be low. However, as in embodiments of the present invention, when the isolation circuit 20 is included between the battery 10 and the division circuit 30, a voltage (e.g., an instantaneous voltage) of the battery 10 may be measured by controlling (e.g., instantaneously controlling) the isolation device 20. Accordingly, a voltage sensed via the isolation circuit 20, as in the current embodiment of the present invention, may be highly reliable and highly accurate. For example, the division circuit 30 may divide the total voltage of the battery by N, and the BMS 70 may measure the divided voltage and may calculate the total voltage of the battery by multiplying the divided voltage by N, where N is a positive real number. N may be determined by the design of the division circuit 30, and the value of N may be stored in the BMS 70.

The isolation circuit 20 includes an isolation device, which may function as a switch. For example, various circuits such as a level shift circuit of a typical switching device or an optical isolator may be used as the isolation device. In detail, a non-contact relay such as an optocopuler (e.g., a photomos relay, a photo coupler, or optical isolator) may be used in the isolation circuit 20 to isolate the battery 10 from the division circuit 30. The isolation device may be turned on or off (e.g., may be turned on or off according to a control signal).

The division circuit 30 is used to divide a battery voltage (e.g., a total battery voltage) at a suitable or predetermined rate and measure the divided voltage. According to one or more embodiments of the present invention, in order for the BMS 70 to control a high-voltage battery system, a total battery voltage is to be measured. In a related art battery system, a battery pack or a battery system whose voltage is to be measured has a high total voltage. Accordingly, measurement equipment having a high voltage limit is used to measure a total voltage of the related art battery system having a high total voltage. However, according to one or more embodiments of the present invention, instead of including the high voltage limit measurement equipment, a voltage (e.g., a total voltage) is divided at a suitable or predetermined rate and the divided voltage is measured, and then the measured voltage is multiplied by the suitable or predetermined rate to calculate the total voltage of the battery 10.

The division circuit 30 includes division elements. The division elements may include resistors R1, R2, . . . Rk or transistors. While the division circuit 30 illustrated in FIG. 2 includes resistors R1, R2, . . . Rk, the type and number of division elements of the division circuit 30 are not limited thereto. Moreover, a division voltage measured by using the BMS 70 is not limited to a voltage applied to a single division element (e.g., a resistor), but may be division voltages applied to a plurality of division elements (e.g., resistors or transistors), which divide a voltage (e.g., the total voltage) of the battery 10 by the suitable or predetermined rate (e.g., N) according to the design characteristics of the BMS 70.

As illustrated in FIG. 2, the isolation circuit 20 is electrically coupled to two ends (terminals) of the division circuit 30, and a capacitor (condenser) 41 for measuring a voltage is coupled to two ends (terminals) of a resistor Rk in the division circuit 30. The BMS 70 may measure a voltage divided by an division element, such as a resistor, in the division circuit 30 by using the capacitor 41 for measuring the voltage.

Figure 4:
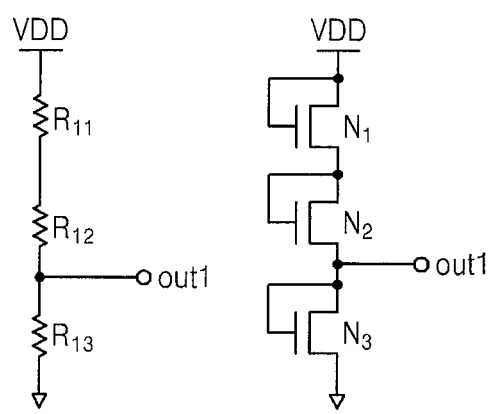
FIG. 4 is a schematic view for explaining calculation of a division voltage with respect to a total voltage via a division circuit according to an embodiment of the present invention.

FIG. 4 is a schematic view for explaining calculation of the division voltage with respect to the total voltage via the division circuit.

Referring to FIG. 4, three resistors R11, R12, and R13 or three transistors N1, N2, and N3 are used to divide a total voltage VDD. Alternatively, the number of the resistors R11, R12, and R13 or the transistors N1, N2, and N3 and connection states thereof may be variously modified.

As shown in the left diagram of FIG. 4, when a division circuit is formed of three resistors R11, R12, and R13, a division voltage out1 is:

$$out1 = \frac{R13}{R11 + R12 + R13} VDD.$$

Also, as shown in the right diagram of FIG. 4, when a division circuit is formed of transistors (e.g., NMOS transistors), a division voltage out2 is divided by a rate of a turn-on resistance value of the transistors (e.g., the NMOS transistors) N1, N2, and N3, that is, $$out2 = \frac{RN3}{RN1 + RN2 + RN3} VDD.$$

Referring to FIG. 2, the BMS 70 controls charging and discharging of the battery 10, and may also control balancing of the battery modules 11a through 11z included in the battery 10. Also, the BMS 70 may monitor voltages between the battery modules 11a through 11z, a temperature of the battery 10, and a charging current or a discharging current, and may determine a full charge capacity of the battery 10 from a monitoring result.

The BMS 70 may include a power terminal VCC, a ground terminal VSS, a voltage measuring terminal Vn, and an isolation circuit control terminal SC.

A power voltage and a ground voltage are applied to the power terminal VCC and the ground terminal VSS, respectively.

According to one or more embodiments, the voltage measuring terminal Vn measures a division voltage value obtained by dividing a total voltage of the battery 10, which is a sum of voltages of the battery cells and the battery 12, by the suitable or predetermined rate. That is, the voltage measuring terminal Vn is coupled to a division element that divides a total voltage applied to the division circuit 20 by the suitable or predetermined rate; and in FIG. 2, the voltage measuring terminal Vn is coupled to a node disposed at an upper end of the resistor Rk so as to measure a voltage applied to the resistor Rk.

In addition, the isolation circuit control terminal SC may transmit a signal for controlling the isolation device (e.g., the switches 20a and 20b) of the isolation circuit 20. The isolation device isolates the battery 10 and the division circuit 30 from each other so as to restrain or prevent a noise signal generated from the PC 200 from affecting the BMS 70, and to accurately measure voltage (e.g., an instantaneous voltage) even if a charging/discharging rate is high.

Figure 5:
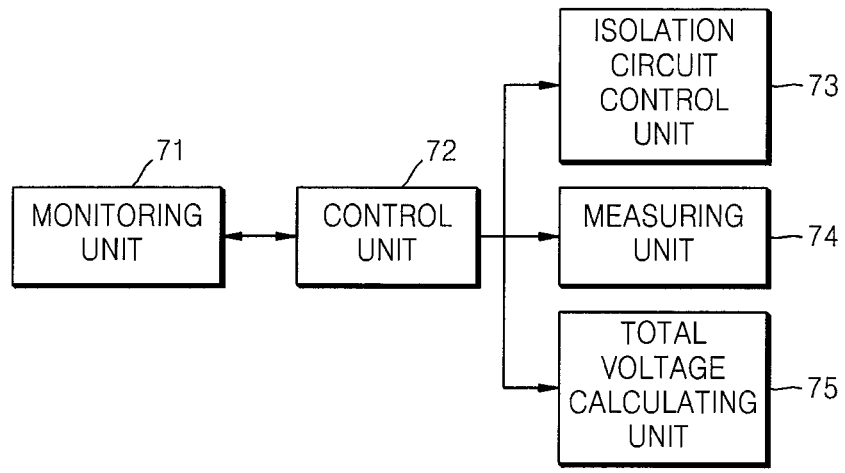
FIG. 5 is a block diagram illustrating a structure of a battery management system (BMS) according to an embodiment of the present invention.

FIG. 5 is a block diagram illustrating a structure of the BMS 70 according to an embodiment of the present invention.

Referring to FIG. 5, the BMS 70 may include a monitoring unit 71, a control unit 72, an isolation circuit control unit 73, a measuring unit 74, and a total voltage calculating unit 75.

The monitoring unit 71 monitors a state of the battery 10. The monitoring unit 71 may measure a temperature, a voltage, a current, or the like of the battery 10, and may calculate (estimate) an amount of energy that is storable or transmittable to a load (e.g., a motor), by using the measured values of the battery 10. The measured values may be transmitted to the control unit 72 as a state of charge (SOC), a state of health (SOH), an available discharging power, a chargeable power, or the like. As described above with reference to FIG. 3, the battery 10 may have a range of fluctuation in voltage due to the high charging/discharging rate, and, thus, a voltage is to be measured at an appropriate time. Accordingly, in one or more embodiments, the monitoring unit 71 monitors a state of the battery 10 and transmits the monitored state of the battery 10 to the control unit 72.

According to one or more embodiments, the control unit 72 controls the overall operation of the BMS 70. The control unit 72 may communicate with the monitoring unit 71 to determine a current state of the battery 10, and may transmit a command signal so that the isolation circuit control unit 73, the measuring unit 74, and the total voltage calculating unit 75 perform their functions.

The isolation circuit control unit 73 may turn on or off devices of the isolation circuit 20 according to a signal of the control unit 72. As described above, when the isolation circuit 20 is turned on, the battery 10 and the division circuit 30 are coupled together and the BMS 70 may measure a division voltage. On the other hand, when the isolation circuit 20 is turned off, the battery 10 and the division circuit 30 are isolated from each other, no voltage is applied to the division elements of the division circuit 30, and the measuring unit 74 is restricted from measuring a voltage (e.g., an instantaneous voltage) of the battery.

In addition, the isolation circuit control unit 73 may generate a signal for controlling an isolation device such that a noise signal, which may be generated, for example, when a large current flows in the battery system 100, does not affect (or substantially does not affect) the voltage measurement by the BMS 70. Also, the isolation circuit control unit 73 may generate a command for turning on the isolation device only for a short period of time so that an accurate measurement is conducted even if, for example, the charging/discharging rate is high in the battery system 100. The time when the isolation device is turned on may be dependent, at least in part, on the capacitance of the capacitor 41, and may be about 100 μs.

In one or more embodiments, the control unit 72 compares the charging/discharging rate to a reference charging/discharging value, and controls the isolation circuit control unit 73 to turn on the isolation device for a short period of time (e.g., couple the battery 10 to the division circuit 30 for a time substantially less than a time when the battery 10 is isolated from the division circuit 30) when the charging/discharging rate is greater than the reference charging/discharging value.

In one or more embodiments, the control unit 72 compares received noise information to a reference noise value, and controls the isolation circuit control unit 73 to turn on the isolation device for a short period of time when the noise information is greater than the reference noise value.

According to one or more embodiments, the measuring unit 74 measures a division voltage applied across the resistor Rk in the division circuit 30. Here, measuring a voltage by using the measuring unit 74 will be described with reference to FIG. 2. When the isolation circuit control unit 74 is turned on, a partial voltage of the battery 10 is applied to the resistor Rk. Then, the capacitor 41 for measuring a voltage is charged with the voltage across the resistor Rk, and the measuring unit 74 measures the voltage charged in the capacitor 41.

Next, the total voltage calculating unit 75 calculates the total voltage of the battery 10 based on the division voltage measured by using the measuring unit 74. Referring to FIG. 4 again, when the division voltage in the division circuit 30 formed of a resistance device is referred to as out1, and a division voltage in the division circuit 30 formed of a transistor device is referred to as out2, a total voltage VDD may be expressed as: VDD=((R11+R12+R13)/R13)*out1 and VDD=((RN1+RN2+RN3)/RN3)*out2, respectively. That is, the total voltage calculating unit 75 may calculate a total voltage of the battery 10 from the measured division voltage in consideration of characteristics of the division elements.

Figure 6:
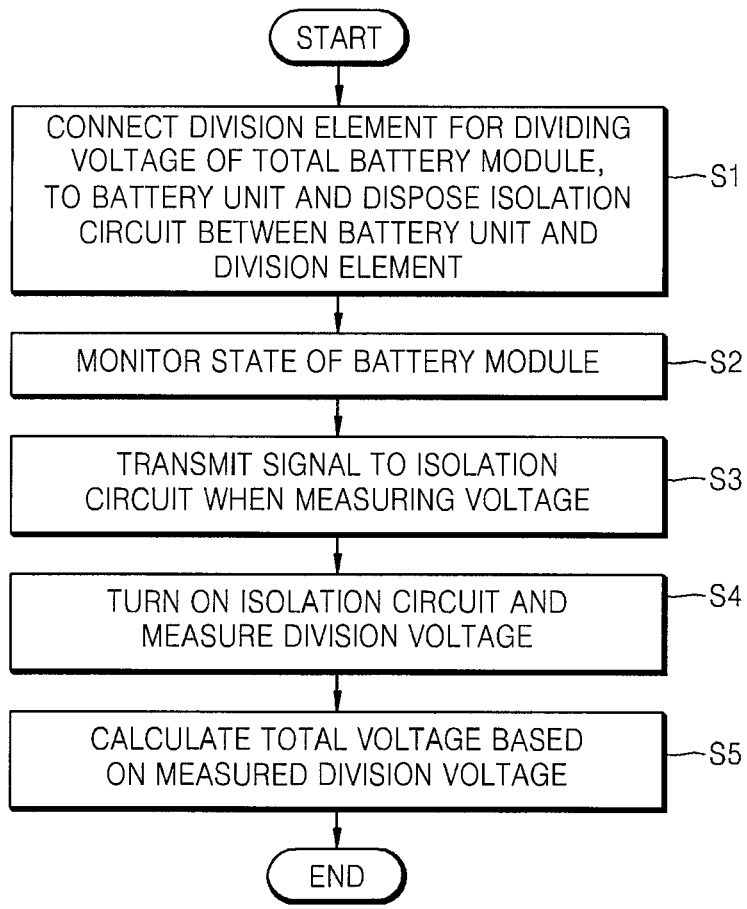
FIG. 6 is a flowchart illustrating an operation of a battery system according to an embodiment of the present invention.

FIG. 6 is a flowchart illustrating an operation of the battery system 100 according to an embodiment of the present invention.

Referring to FIG. 6, in operation S1, the division elements for dividing a voltage of the battery modules 11 are coupled to the battery 10, and the isolation circuit 20 that isolates the battery 10 and the division circuit 30 from each other is connected therebetween.

In operation S2, the monitoring unit 71 of the BMS 70 monitors a battery state. The monitoring unit 71 may monitor a state of the battery 10 whether the isolation circuit 20 is turned on or off, and whether or not there is a noise signal transmitted from the PCS 200.

In operation S3, when the control unit 72 of the BMS 70 transmits a command to turn on or off devices of the isolation circuit 20 to the isolation circuit control unit 73, the isolation circuit control unit 73 transmits a signal that turns on or off an isolation device (e.g., a switching device).

In operation S4, when the capacitor 41 is charged with a voltage applied to the resistor Rk, the measuring unit 74 of the BMS 70 measures the charged voltage of the capacitor 41 to thereby measure the division voltage applied to the resistor Rk.

In operation S5, a total voltage of the battery 10 is calculated using the measured division voltage.

According to the method of measuring a voltage of a battery pack of the embodiments of the present invention, by using the isolation circuit 20, a variation (e.g., an abrupt variation) in voltage due to, for example, the high charging/discharging rate and/or influence of a noise signal may be reduced or minimized. Accordingly, a voltage of a battery pack may be measured efficiently.

While this invention has been particularly shown and described with reference to exemplary embodiments thereof, it will be understood by those of ordinary skill in the art that various changes in form and details may be made therein without departing from the spirit and scope of the invention as defined by the appended claims and their equivalents. The exemplary embodiments should be considered in descriptive sense only and not for purposes of limitation.

It should be understood that the exemplary embodiments described therein should be considered in a descriptive sense only and not for purposes of limitation. Descriptions of features or aspects within each embodiment should typically be considered as available for other similar features or aspects in other embodiments.

DESCRIPTION OF REFERENCE NUMERALS

| | |
|---|---|
| 1: energy storage system | 2: power generation system |
| 3: grid | 4: load |
| 10: battery | 11: battery module |
| 12: battery cell | 20: isolation circuit |
| 30: division circuit | 41: capacitor for measuring voltage |
| 50: positive electrode terminal | 51: negative electrode terminal |
| 70: BMS | 71: monitoring unit |
| 72: control unit | 73: isolation circuit control unit |
| 74: measuring unit | 75: total voltage calculating unit |
| 100: battery system | 200: PCS |
| 201: capacitor | 210: power converting unit |
| 220: DC link unit | 230: inverter |
| 240: converter | 250: first switch |
| 260: second switch | 270: integrated controller |

What is claimed is:

1. A battery system comprising:
   a battery comprising at least one battery cell;
   a division circuit configured to receive a first voltage of the battery, generate a second voltage from the first voltage, and output the second voltage;
   an isolation circuit coupled between the battery and the division circuit, the isolation circuit being configured to electrically isolate the battery from the division circuit according to a control signal; and
   a battery management system coupled to the division circuit, the battery management system comprising:
      an isolation circuit control unit configured to generate the control signal;
      a measuring unit configured to measure the second voltage;
      a monitoring unit configured to monitor a state of the battery and to generate battery state information; and
      a control unit configured to receive the battery state information, and control the isolation circuit control unit to selectively provide the control signal according to the battery state information, wherein
   the isolation circuit is configured to electrically isolate the battery from the division circuit when the control signal is not provided,
   the battery state information comprises a charging/discharging rate of the battery or a noise signal from the battery,
   the monitoring unit is configured to monitor the charging/discharging rate of the battery or the noise signal from the battery, and
   the control unit is configured to compare the charging/discharging rate or the noise signal to a corresponding reference value, and to control the isolation circuit control unit to provide the control signal for a time substantially less than a time when the control signal is not provided when the charging/discharging rate or the noise signal is greater than the corresponding reference value.

2. The battery system of claim 1, wherein the battery management system further comprises a voltage calculating unit configured to calculate the first voltage from the second voltage.

3. The battery system of claim 1, further comprising a capacitor coupled to the division circuit and the battery management system, the capacitor being configured to be charged with the second voltage.

4. The battery system of claim 1, wherein:
   the battery further comprises a first battery terminal and a second battery terminal;
   the division circuit comprises a first input terminal and a second input terminal;
   the isolation circuit comprises a first switch and a second switch;
   the first switch is configured to couple the first battery terminal to the first input terminal according to the control signal;
   the second switch is configured to couple the second battery terminal to the second input terminal according to the control signal;
   the at least one battery cell is coupled between the first battery terminal and the second battery terminal; and
   the division circuit comprises a plurality of division elements coupled between the first input terminal and the second input terminal for dividing the first voltage into the second voltage.

5. The battery system of claim 4, wherein
   the plurality of division elements includes a first division element, and
   the measuring unit is coupled to the first division element and configured to measure the second voltage by measuring a voltage across the first division element.

6. The battery system of claim 5, wherein the plurality of division elements comprises resistors.

7. The battery system of claim 5, wherein the plurality of division elements comprises transistors.

8. The battery system of claim 4, wherein the first switch and the second switch comprise optocouplers.

9. The battery system of claim 1, wherein the first voltage is a total voltage of the battery; and the second voltage is proportional to the total voltage by a factor of N, where N is a positive real number.

10. The battery system of claim 1, wherein the second voltage is an instantaneous voltage.

11. An energy storage system comprising:

a power control system; and a battery system coupled to the power control system and comprising:

a battery comprising at least one battery cell;

a division circuit configured to receive a voltage of the battery, to generate a divided voltage from the voltage of the battery; and to output the divided voltage;

an isolation circuit coupled between the battery and the division circuit, the isolation circuit being configured to electrically isolate the battery from the division circuit according to a control signal; and a battery management system coupled to the division circuit, the battery management system being configured to monitor a state of the battery, to generate the control signal according to the state of the battery, to receive the divided voltage, and to calculate a total voltage of the battery from the divided voltage, wherein the energy storage system is configured to store a power generated by a power generation system or a grid in the battery, and supply the power stored in the battery to a load or the grid, the power control system is configured to convert power of at least one of the power generation system, the grid, or the battery, and the battery management system is configured to monitor a charging/discharging rate of the battery or a noise signal from the battery, to compare the charging/discharging rate or the noise signal to a corresponding reference value, and to provide the control signal to electrically couple the battery to the division circuit for a time substantially less than a time when the control signal is not provided when the charging/discharging rate or the noise signal is greater than the corresponding reference value.

12. The energy storage system of claim 11, wherein the divided voltage is an instantaneous voltage.

\* \* \* \* \*